Figure 1:
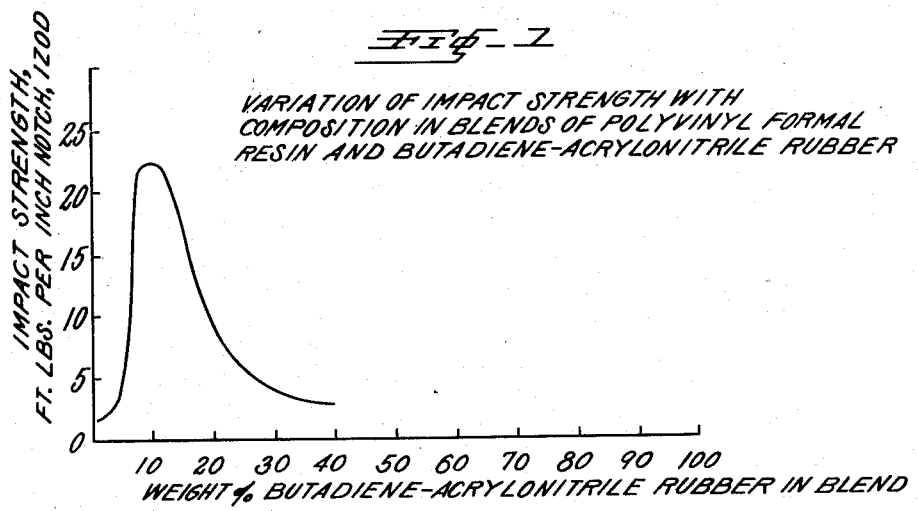

VARIATION OF IMPACT STRENGTH WITH COMPOSITION IN BLENDS OF POLYVINYL FORMAL RESIN AND BUTADIENE-ACRYLONITRILE RUBBER

VARIATION OF FLEXURAL MODULUS WITH COMPOSITION IN BLENDS OF POLYVINYL FORMAL RESIN AND BUTADIENE-ACRYLONITRILE RUBBER

INVENTOR.
CHARLES F. FISK
BY James J. Long
AGENT

Patented July 20, 1954

2,684,352

UNITED STATES PATENT OFFICE 2,684,352

HIGH IMPACT STRENGTH THERMOPLASTIC COMPOSITION CONTAINING POLYVINYL ACETAL RESIN AND BUTADIENE ELASTOMER

Charles F. Fisk, Clifton, N. J., assignor to United States Rubber Company, New York, N. Y., a corporation of New Jersey Application October 12, 1953, Serial No. 385,572

13 Claims. (Cl. 260—45.5)

This invention concerns improved tough "gum plastic" mixtures, and more particularly it concerns certain novel blends of polyvinyl acetal resins with certain rubbery butadiene copolymers, characterized particularly by unusually high impact strength, in combination with great hardness and rigidity.

This application is a continuation-in-part of my copending application Serial No. 269,051, filed January 30, 1952, now abandoned.

The invention is based on the unexpected discovery that admixture of certain rubbery butadiene copolymers with polyvinyl acetal resins in certain proportions produces a hard, tough mixture having an impact strength far in excess of that of mixtures of these same materials in other proportions. More specifically, it has been found that addition of relatively minor amounts of certain rubbery butadiene copolymers, within the range of from about 5 to about 30 parts by weight, to polyvinyl acetal resins, correspondingly in amount within the range of from about 95 to about 70 parts by weight, produces a remarkable improvement in impact strength.

The polyvinyl acetal resins employed in the invention are well known materials, typically derived by conventional methods from polyvinyl acetate either directly by the action of aldehydes on the polyvinyl acetate, or by hydrolysis of the polyvinyl acetate to polyvinyl alcohol, followed by reaction with an aldehyde. High-polymer chemists use the term "polyvinyl acetals" to designate the resins which have been converted in major part to acetal, with only very minor amounts of unconverted acetate groups and/or hydroxyl groups remaining. The final polyvinyl acetal resin is generally characterized by the viscosity of the polyvinyl acetate used as the starting material and the degree of acetate replacement by aldehyde. It has been found that the high impact strength phenomenon of the present invention is obtained only with those polyvinyl acetal resins in which the acetate replacement by aldehyde is relatively high, preferably well over about 75% (in terms of the nominal degree of replacement in accordance with the practice in the trade). This means that 75 mole-percent of the original acetate groups of the polymer have been converted to acetal groups, and the remaining 25% is in the form of groups other than acetal. Such remaining 25% is generally composed in part of alcohol groups, and in part of unconverted acetate groups. The ratio of residual acetate groups to alcohol groups in the polymer is immaterial for purposes of the invention, as long as the acetate and alcohol groups taken together correspond to not more than 25% of the original acetate groups. In other words, the important requirement is that 75% of the original acetate groups in the resin must be converted to acetal groups, and the residuum may be entirely in the form of acetate, or entirely in the form of alcohol, or of both acetate and alcohol. The approximate polyvinyl acetal content of the resin molecule will hereinafter be referred to as the nominal ester replacement or conversion value, meaning replacement of acetate in the original polyvinyl acetate by aldehyde. The polyvinyl acetal resins are usually made from the lower alkyl aldehydes, such as formaldehyde, acetaldehyde and butyraldehyde. Polyvinyl formal and polyvinyl butyral constitute the commonest commercially available polyvinyl acetal resins. Of these materials, polyvinyl formal represents the preferred polyvinyl acetal resin for use in the invention. The polyvinyl acetals are thermoplastic resins; they are much used in coating and laminating, and they can also be molded into shaped articles. They are insoluble in water, in direct contrast to resins constituted of a major proportion of polyvinyl alcohol, which are generally soluble in water. While they have many desirable physical characteristics, their impact strength is not as great as is required for certain uses. The impact strength of the polyvinyl acetals can be improved only slightly by addition of plasticizers, and this expedient results in a concomitant loss of rigidity and hardness. The present invention affords a means for increasing the impact strength of the polyvinyl acetals, without undue sacrifice of rigidity or hardness, by addition of small amounts of certain rubbery butadiene copolymers.

The rubbery butadiene copolymers employed in the invention are also well known materials and they are obtained by interpolymerization of butadiene with certain copolymerizable monoolefinic materials such as acrylonitrile, methacrylonitrile, lower alkyl acrylates, lower alkyl methacrylates, lower alkyl maleates, lower alkyl fumarates, styrene, alpha-methyl styrene, para-methyl styrene, alpha, para-dimethyl styrene, 2-vinyl pyridine, 3-vinyl pyridine, 4-vinyl pyridine, as well as mono-lower-alkyl mono-vinyl pyridines, including particularly 2-ethyl-5-vinyl pyridine, 5-ethyl-2-vinyl pyridine, and 2-methyl-5-vinyl pyridine. Generally such elastomers contain at least about 25 weight-per cent butadiene. The rubbery copolymers of butadiene are commonly prepared by emulsion polymerization, as is well known in the art. Several of the common commercially available synthetic rubbers, such as GR–S (butadiene-styrene copolymer), and Perbunan or Paracril (butadiene-acrylonitrile copolymer) fall within this category, and the latter is a preferred material for use as the rubbery butadiene copolymer in this invention.

The resin-elastomer blends of the invention are prepared by intimately mixing in bulk the solid polyvinyl acetal resin and the solid rubbery butadiene copolymer in the required proportions in any suitable manner. The mixing equipment commonly used for working rubber or plastics, such as roll mills or internal mixers, is suitable for this purpose, and the mixing operation is facilitated by elevated temperatures. The milling temperatures commonly employed when compounding polyvinyl acetals, e. g., stock temperatures of about 300° to 350° F., may be employed to advantage. In general, it has been found that the present blends of resin and elastomer in the stated proportions possess unusually good processability and they can be readily mixed to a smooth consistency without exceeding a mixing temperature of about 300° to 350° F., whereas previously known "gum plastic" blends of resins and rubbers have required substantially higher processing temperatures, usually temperatures above 350° and as high as 400° F., for adequate mixing. This facility of mixing and processing is an important advantage of the present polyvinyl acetal resin-butadiene copolymer elastomer blends. Similarly, the present blends can be molded easily at temperatures of about 300° to 330° F.

When a rubber mill is used, the rubbery butadiene copolymer can be first banded by cold working on the mill, and then the unmelted polyvinyl acetal resin powder is added in the required proportions on the cool mill, thus forming a very dead and "baggy" sheet, after which the mill rolls are heated to about 300° F. Alternatively, the mill rolls may be already at a temperature of 300° F. or above when both the rubber and the resin are added. In either case, the polyvinyl acetal resin melts and apparently dissolves in the elastomer, and the mixture thereafter generally hugs the mill tightly like an ordinary rubber compound. The blend can then be sheeted off the mill in a smooth, limp sheet, which becomes hard and horny on cooling. The material may be chopped up or ground to produce lumps or powder suitable for molding, extruding, or calendering at elevated temperatures. Test specimens can be prepared from this material by molding in a suitable mold at 330° F., and then cooling the mold. The material may be mixed with other compounding ingredients such as fillers, dyes, pigments, stabilizers, and the like. The materials are truly thermoplastic, and may be re-milled and re-molded without loss of properties. The molded products also remain soluble in organic solvents.

The most preferred mixtures of polyvinyl acetal resin with butadiene elastomer coming within the scope of the invention are characterized by remarkably high impact strength of about 4 or more foot-pounds per inch of notch, as measured by the Izod notched sample method. Those skilled in the art will freely recognize 4 foot-pounds as a remarkable value for the impact strength of a hard plastic material, particularly in view of the fact that the polyvinyl acetal resin itself generally has an impact strength of less than 1 foot-pound. It will be understood that it is only remarkable for a plastic material to have such a high impact strength when the high impact strength is accompanied by a high modulus and high hardness. The present blends are hard and have a flexural modulus almost invariably considerably in excess of 100,000 pounds per square inch, so that they are definitely rigid materials. There is nothing unusual in high impact strength if the flexural modulus is much below 100,000 p. s. i., and particularly when below 50,000 p. s. i. When the modulus is so low the materials are definitely non-rigid and flexible, and the Izod impact test simply yields readings that numerically are high, but meaningless with respect to indicating the true toughness of the material. The flexural modulus of the material is conveniently measured by twisting a 0.1" x 0.5" x 4" molded sample at room temperature, using the torsion apparatus of Clash and Berg, as described in Industrial and Engineering Chemistry, 34, 1218 (1942). The flexural modulus test can also be carried out at an elevated temperature, e. g., 75° C., to provide an indication of the resistance of the materials to heat distortion. The preferred materials of the invention frequently exhibit a flexural modulus of 100,000 p. s. i. at 75° C., which is considered good, or even values of 150,000 p. s. i. or higher, which is considered very good, both connoting high resistance to heat softening. In this connection it may also be mentioned that the preferred polyvinyl acetal resin-butadiene elastomer blends of this invention are typically capable of attaining an ASTM heat distortion temperature of about 85° to 90° C. at 264 p. s. i. fiber stress.

While the invention is applicable to the polyvinyl acetal resins and butadiene elastomers within the classes indicated above, it has been found that all of the resins and all of the elastomers in these classes are not fully equivalent to each other, but rather that there are definite distinguishing characteristics among the various possible combinations of resin and elastomer coming within these classes. Thus, it has been found that the maximum increase in impact strength does not occur at exactly the same critical percentage composition in all of the various combinations of polyvinyl acetal resin and rubbery butadiene copolymer. The properties of the blends are profoundly affected by the nature and proportion of the second monomer. Furthermore, it has been unexpectedly observed that certain combinations of materials within these classes have almost perfect optical transparency. This is perhaps the most surprising property, and represents a most unusual advantage, since transparent gum plastic mixtures that are hard and tough have never before been known, as far as the inventor is aware.

The peculiarities of certain of the preferred blends of the invention will become evident from a consideration of the following working examples and subsequent discussion. In the examples, all parts are expressed by weight.

EXAMPLE I

This example illustrates the practice of the invention with butadiene-acrylonitrile synthetic rubber as the elastomeric component of the mixture. The elastomer was a commercial material, marketed under the trade designation "Hycar OR-15." This material contains about 40 weight-percent of combined acrylonitrile. The polyvinyl acetal resin mixed with this elastomer was a commercial grade of polyvinyl formal, marketed under the trade designation "Formvar 7/90." This acetal resin has a nominal acetate replacement value of 90%. The figures 7/90 indicate that the acetal resin was derived from a polyvinyl acetate having a viscosity of 7 centipoises (for a benzene solution containing 86 grams per liter), and that the reaction of the hydrolyzed polyvinyl acetate with formaldehyde was carried to the extent of 90% replacement of the acetate by aldehyde. However, the percentage replacement figure, as designated by the manufacturers, is evidently merely a nominal figure adopted for convenience, as the manufacturer's published analysis of the polyvinyl formal reveals a polyvinyl alcohol content of 7% and a polyvinyl acetate content of 19%, and the remainder polyvinyl formal, in the polymer chain. The Formvar 7/90 was added to the Hycar OR-15 on a mill in the proportions shown in Table I below, and worked at 300° F. to form a smooth blend, and test specimens were molded from this material at 330° F. The samples were tested for impact strength and flexibility, i. e., flexural modulus, and the hardness of the blends was also observed, as well as the transparency and relative cloudiness of the blends, with the results noted in the table.

The impact strength values in the foregoing table have been plotted against composition in the graph, Fig. 1 of the accompanying drawing. It will be noted from inspection of Table I and Fig. 1 that there is a remarkable synergy in respect to the impact strength, which attains a surprisingly high maximum value of about 22 foot-pounds when the blend contains about 10 parts of Hycar OR-15 in 100 parts of the blend. This blend is more than 20 times tougher than the Formvar 7/90 itself. This peak value for the impact strength is reached very sharply within a narrow composition range; that is, the impact strength falls off sharply on either side of the peak value with a relatively small increase or decrease in the proportion of Hycar OR-15 in the mixture. The proportion of Hycar OR-15 is especially critical at concentrations below 10 percent, as will be evident from inspection of the graph; and when the proportion of Hycar OR-15 is as low as about 6 percent, the impact strength has already dropped to about 4 foot-pounds. Increasing the proportion of Hycar OR-15 above 10 percent results in a somewhat less steep falling off of the impact strength, with a value of 4 foot-pounds attained when the concentration of Hycar is somewhere between 20 and 30 percent.

Figure 2:
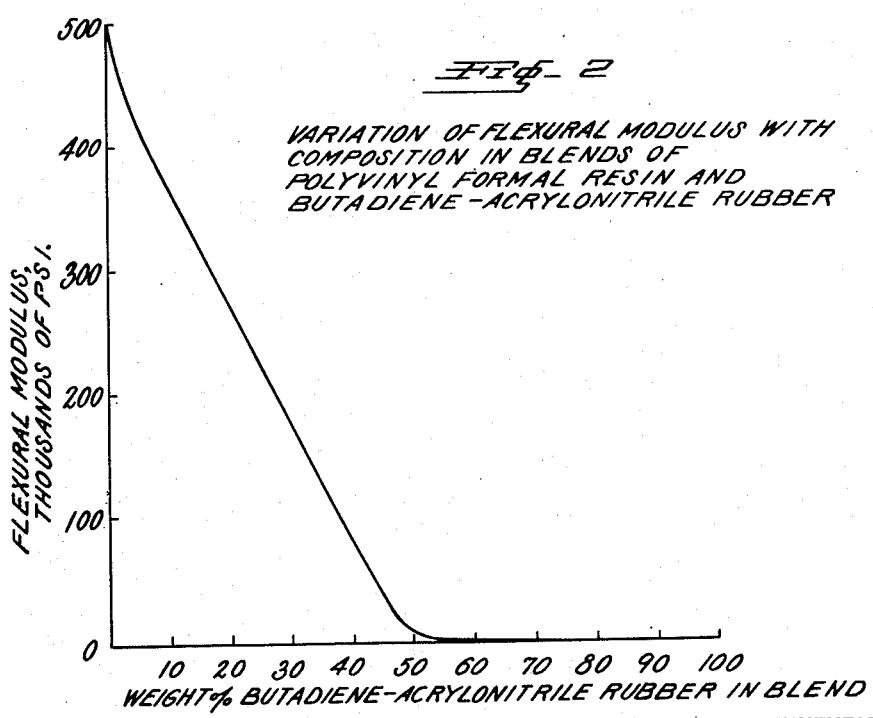

It should be emphasized that the blends within the composition range having an impact strength of 4 foot-pounds or more are still definitely rigid materials. This will be apparent from inspection of the flexural modulus figures in Table I, as well as from inspection of Fig. 2, which is a graphical plot of the variation in flexural modulus with the proportion of Hycar OR-15 in the blend. Thus, at the upper limit of Hycar OR-15 concentration for attainment of an impact strength of about 4 foot-pounds, that is, at a proportion of Hycar OR-15 within the range of from 20 to 30 percent, the flexular modulus is still about 200,000 p. s. i. This is more than adequate to permit the use of the material in fabricating rigid articles, which are commonly considered to require a flexural modulus of at least about 100,000 p. s. i. for adequate rigidity. At the lower limit of Hycar OR-15 concentration for attainment of an impact strength of about 4 foot-pounds, that is, when the proportion of Hycar OR-15 is about 6 percent, the flexural modulus is not very much lower than that of the Formvar 7/90 itself.

Similarly, it will be observed from consideration of the data of Table I that the hardness of the high impact strength blends is essentially equal to that of the Formvar 7/90 itself on the low side of the optimum proportion of Hycar OR-15, and even on the high side of the optimum

TABLE I

*Formvar 7/90—Hycar OR-15 blends*

EFFECT OF RESIN/RUBBER RATIO

| Stock Code | I-1 | I-2 | I-3 | I-4 | I-5 | I-6 | I-7 | I-8 | I-9 | I-10 |
|---|---|---|---|---|---|---|---|---|---|---|
| Formvar 7/90 } parts | 50 | 60 | 70 | 80 | 85 | 87.5 | 90 | 92.5 | 95 | 100. |
| Hycar OR-15 } parts | 50 | 40 | 30 | 20 | 15 | 12.5 | 10 | 7.5 | 5 | 0. |
| Impact Strength, ft.-lbs. per inch notch, Izod, 25° C. | | 2.9 | 3.9 | 11.1 | 12.5 | 20.5 | 22.5 | 20.9 | 2.9 | 1.2. |
| Flexural Modulus, thousands of p. s. i., 25° C. | 7 | 56 | 181 | 275 | 313 | 336 | 375 | 393 | 415 | 496. |
| Rockwell Hardness, R scale | | | 66 | 98 | 107 | 111 | 114 | 116 | 119 | 122. |
| Shore Hardness, D scale | 37 | 56 | 73 | 79 | 82 | 83 | 83 | 84 | 85 | 85. |
| Transparency | No | No | Yes | Yes | Yes | Yes | Yes | Yes | Yes | Yes. |
| Cloudiness* | | | VC | VC | C | C | SC | SC | VSC | VSC. |

*VC=very cloudy, C=cloudy, SC=slightly cloudy, VSC=very slightly cloudy.

value the high impact blends are still definitely hard materials. In fact, the blends of the invention are believed to be harder than any other known tough gum plastics. A molding, ⅛ inch thick, of stock I-7 is so tough that it can be struck hard with a hammer without fracture and yet is so hard that it cannot be scratched or marked with the fingernail.

The most favorable combination of impact strength, flexural modulus, and hardness occurs when the proportion of Hycar OR-15 is within the range of from about 5% to about 30% of the blend, and more especially when the proportion of this elastomer is within a narrower lower segment of this concentration range, namely, within the segment of from about 5% to about 15%. On this basis, the stocks coded I-4, I-5, I-6, I-7 and I-8 represent the preferred practice of the invention.

Particular notice should be taken of the transparency of the mixtures embodying the preferred range of proportions. As stated, this is believed to be a unique phenomenon in the field of tough, rigid gum plastics. The molded samples of the present materials are optically clear in the same way that glass is clear, but they have a light yellowish color. The qualitative ratings for the cloudiness of the moldings as given in Table I should also be noted. The stocks rated very slightly cloudy are almost optically perfect. The cloudy rating means that insoluble matter is unquestionably present, interfering with the clarity by scattering light. The very cloudy rating means that the sample is nearly opaque at ⅛" thickness, but that a sunlit scene can be seen clearly by holding the sample close to the eyes.

Similar results are obtained when methacrylonitrile is used in place of acrylonitrile in preparing the rubbery butadiene copolymer.

EXAMPLE II

This example illustrates comparative results obtained by mixing Formvar 7/90 with various commercial nitrile rubbers. The blends were prepared and tested as described previously, employing 10 parts of the elastomer to 90 parts of the Formvar 7/90, and also 80 parts of the elastomer to 20 parts of the Formvar 7/90, with the results listed in the following table:

EXAMPLE III

This example illustrates the practice of the invention with various commercial polyvinyl acetal resins in blends of 90 parts of the acetal resin with 10 parts of the elastomer. Results with two rubbers are shown: Paracril 35, a commercial butadiene-acrylonitrile copolymer; and A251, a laboratory-prepared copolymer of butadiene and methyl methacrylate, containing 51.7% methyl methacrylate. The mixes were prepared and tested as indicated previously, and the resulting data are tabulated in Table III. The Formvar resins, as indicated previously, are polyvinyl formals, while the Butvar resins are polyvinyl butyrals. Vinylite XYSG is a commercial type of polyvinyl butyral made from a relatively high viscosity polyvinyl acetate and having a relatively high replacement.

TABLE III

*Comparison of various polyvinyl acetals with 90/10 resin/rubber blends*

| Stock | Resin | Rubber | Impact | Flexural Modulus×10⁻³ | Rockwell | Shore D | Cloudiness |
|---|---|---|---|---|---|---|---|
| III-1 | Formvar 12/85 | None | .60 | 510 | 121 | 85 | VSC. |
| III-2 | do | Paracril 35 | 21.8 | 399 | 112 | 81 | SC. |
| III-3 | do | A251 | 20.1 | 429 | 115 | 81 | SC. |
| III-4 | Formvar 7/90 | None | .99 | 500 | 122 | 85 | VSC. |
| III-5 | do | Paracril 35 | 21.7 | 394 | 115 | 82 | SC. |
| III-6 | do | A251 | 21.9 | 406 | 115 | 83 | C. |
| III-7 | Formvar 8/95 | Paracril 35 | 21.1 | 384 | 114 | 82 | SC. |
| III-8 | Formvar 15/95E | None | 1.30 | 485 | 121 | 86 | SC. |
| III-9 | do | Paracril 35 | 24.6 | 386 | 110 | 83 | SC. |
| III-10 | do | A251 | 19.3 | 410 | 115 | 82 | SC. |
| III-11 | Formvar 15/95S | None | 1.95 | 477 | 122 | 86 | VSC. |
| III-12 | do | Paracril 35 | 22.0 | 366 | 110 | 82 | SC. |
| III-13 | do | A251 | 18.2 | 368 | 113 | 82 | SC. |
| III-14 | Butvar 25/98 | None | .53 | 309 | 113 | 79 | VSC. |
| III-15 | do | Paracril 35 | 12.1 | 250 | 91 | 73 | VC. |
| III-16 | Butvar 55/98LH | None | 1.16 | 347 | 112 | 78 | VSC. |
| III-17 | do | Paracril 35 | 12.8 | 262 | 96 | 74 | VC. |
| III-18 | Vinylite XYSG | None | 1.30 | 340 | 114 | 79 | VSC. |
| III-19 | do | Paracril | 23.8 | 274 | 102 | 76 | VC. |
| III-20 | do | A251 | 18.6 | 279 | 105 | 76 | SC. |

The following analytical data further characterize certain of the polyvinyl acetal resins employed in Example III:

| Resin | Polyvinyl Alcohol Content | Polyvinyl Acetate Content |
|---|---|---|
|  | *Percent* | *Percent* |
| Formvar 8/95 | 8.0 | 16.0 |
| Formvar 12/85 | 5.5 | 22.5 |
| Formvar 15/95S | 8.0 | 11.0 |
| Butvar 25/98LH | 12.0 | 2.0 |
| Butvar 55/98 | 19.0 | 2.0 |
| Vinylite XYSG | 7.0 | 0.3 |

TABLE II

*Blends of Formvar 7/90 with commercial nitrile rubbers*

90/10 RESIN-RUBBER RATIO

| Stock | Trade Designation of Nitrile Rubber | Wt-Percent Combined Acrylonitrile in Rubber | Impact | Rockwell | Shore D | Flexural Modulus (thousands of p. s. i.) | | Appearance | |
|---|---|---|---|---|---|---|---|---|---|
| | | | | | | 25° C. | 75° C. | Trans. | Cloudiness |
| II-1 | Hycar OR-15 | 40 | 22.5 | 117R | 83 | 388 | 180 | Yes | SC. |
| II-2 | Hycar OR-25 | 32 | 12.8 | 113R | 84 | 396 | 172 | Yes | VC. |
| II-3 | Paracril 35 | 35 | 19.3 | 115R | 82 | 386 | 149 | Yes | SC. |
| II-4 | Paracril 26 | 26 | 14.2 | 115R | 82 | 398 | 150 | Yes | C. |
| II-5 | Paracril 18 | 18 | 13.5 | 111R | 80 | 390 | 139 | Yes | VC. |

80/20 RESIN-RUBBER RATIO

| II-6 | Hycar OR-15 | 40 | 11.1 | 96R | 75 | 277 | 57 | Yes | VC. |
| II-7 | Hycar OR-25 | 32 | 1.8 | 78R | 74 | 222 | 89 | Yes | VC. |
| II-8 | Paracril 35 | 35 | 10.8 | 93R | 78 | 292 | 102 | No | |
| II-9 | Paracril 26 | 26 | 0.8 | 72R | 74 | 220 | 74 | Yes | VC. |
| II-10 | Paracril 18 | 18 | 1.1 | 83R | 74 | 272 | 85 | No | |

EXAMPLE IV

This example illustrates the use of rubbery butadiene-methyl methacrylate copolymer as the elastomeric component of the blends of the invention. The stocks were mixed and tested as previously, in a ratio of 90 parts of resin to 10 parts of rubber, and also in a ratio of 80 parts of resin to 20 parts of rubber. The resin in each case was Formvar 7/90.

TABLE IV

*Blends of Formvar 7/90 with butadiene-methyl methacrylate rubbers*

90/10 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| IV-1 | 19.3 | 15.1 | 110R | 82 | 378 | -------- | Yes | VSC. |
| IV-2 | 44.0 | 13.4 | 112R | 82 | 363 | 108 | Yes | VSC. |
| IV-3 | 51.7 | 25.9 | 115R | 82 | 408 | 156 | Yes | VSC. |
| IV-4 | 58.5 | 19.7 | 115R | 83 | 371 | -------- | Yes | VSC. |
| IV-5 | 64.5 | 24.3 | 112R | 84 | 398 | 142 | Yes | VSC. |
| IV-6 | 74.2 | 2.4 | 119R | 84 | 437 | 143 | Yes | VSC. |

80/20 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| IV-7 | 19.3 | 1.0 | -------- | 63 | 194 | -------- | Yes | C. |
| IV-8 | 44.0 | 8.1 | 97R | 76 | 295 | 92 | No | |
| IV-9 | 51.7 | 15.2 | 105R | 78 | 341 | 113 | Yes | SC. |
| IV-10 | 58.5 | 16.4 | -------- | 80 | 316 | -------- | Yes | SC. |
| IV-11 | 64.5 | 19.1 | 107R | 80 | 313 | 108 | Yes | VSC. |
| IV-12 | 74.2 | 21.5 | 112R | 83 | 355 | 116 | Yes | VSC. |

EXAMPLE V

Table V shows the good results obtained when the invention is carried out, in the manner previously described, with butadiene-methyl acrylate copolymers as the rubbery component.

TABLE V

*Blends of Formvar 7/90 with butadiene-methyl acrylate rubbers*

90/10 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| V-1 | 26.5 | 16.2 | 111R | 80 | 404 | 114 | No | |
| V-2 | 32.0 | 14.1 | 113R | 82 | 442 | -------- | Yes | VC. |
| V-3 | 41.5 | 12.6 | 112R | 80 | 390 | 143 | Yes | SC. |
| V-4 | 53.5 | 23.9 | 116R | 83 | 412 | 147 | Yes | SC. |
| V-5 | 63.5 | 18.5 | 116R | 84 | 373 | -------- | Yes | VSC. |
| V-6 | 64.5 | 13.6 | 112R | 81 | 383 | 150 | Yes | SC. |
| V-7 | 76.5 | 21.1 | 116R | 85 | 434 | -------- | Yes | VSC. |

80/20 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| V-8 | 26.5 | 0.5 | 68R | 63 | 200 | 58 | No | |
| V-9 | 32.0 | 0.6 | 77R | 65 | 260 | -------- | No | |
| V-10 | 41.5 | 1.3 | 83R | 74 | 266 | 67 | No | |
| V-11 | 53.5 | 4.5 | 94R | 80 | 286 | 87 | No | |
| V-12 | 63.5 | 13.7 | 107R | 82 | 334 | -------- | Yes | VSC. |
| V-13 | 64.5 | 10.3 | 93R | 78 | 288 | 105 | No | |
| V-14 | 76.5 | 14.1 | 107R | 82 | 441 | -------- | Yes | SC. |

EXAMPLE VI

Table VI summarizes the results obtained in the same manner with rubbery butadiene-ethyl acrylate copolymers.

TABLE VI

*Blends of Formvar 7/90 with butadiene-ethyl acrylate rubbers*

90/10 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| VI-1 | 31.5 | 12.4 | 111R | 79 | 370 | 141 | Yes | VC. |
| VI-2 | 49.0 | 12.8 | 112R | 82 | 368 | 135 | Yes | SC. |
| VI-3 | 57.2 | 15.7 | 115R | 82 | 408 | 151 | Yes | C. |
| VI-4 | 63.8 | 16.3 | 114R | 82 | 396 | 149 | Yes | C. |
| VI-5 | 76.0 | 15.6 | 105R | 83 | 455 | | Yes | VC. |

80/20 RESIN-RUBBER RATIO

| VI-6 | 31.5 | 0.6 | 75R | 69 | 245 | 84 | No | |
| VI-7 | 49.0 | 0.8 | 82R | 73 | 251 | 70 | No | |
| VI-8 | 57.2 | 8.1 | 96R | 81 | 336 | 108 | No | |
| VI-9 | 63.8 | 5.3 | 97R | 76 | 311 | 94 | No | |
| VI-10 | 76.0 | 12.5 | 100R | 80 | 356 | | Yes | VC. |

EXAMPLE VII

In this example, butadiene-diethyl fumarate copolymers were employed as the elastomeric component, with the results shown in Table VII:

TABLE VII

*Blends of Formvar 7/90 with butadiene-diethyl fumarate rubbers*

90/10 RESIN-RUBBER RATIO

| Stock | Weight Proportion of Ester in Rubber, Percent | Impact | Rockwell | Shore D | Flexural Modulus×10⁻³ | | Appearance | |
|---|---|---|---|---|---|---|---|---|
| | | | | | 25° C. | 75° C. | Trans. | Cloud. |
| VII-1 | 43.8 | 13.7 | 115R | 83 | 423 | 131 | Yes | SC. |
| VII-2 | 62.2 | 25.2 | 118R | 84 | 443 | 138 | Yes | VSC. |
| VII-3 | 68.0 | 8.2 | 113R | 83 | 402 | 139 | Yes | SC. |

80/20 RESIN-RUBBER RATIO

| VII-4 | 43.8 | 0.7 | 73R | 70 | 248 | 61 | No | |
| VII-5 | 62.2 | 5.0 | 93R | 77 | 332 | 80 | No | |
| VII-6 | 68.0 | 11.2 | 96R | 76 | 303 | 75 | No | |

Similar results are obtained when a butadiene-diethyl maleate copolymer is substituted for the butadiene-diethyl fumarate copolymer in this example.

EXAMPLE VIII

The results obtained with rubbery copolymers of butadiene with vinyl pyridine or vinylidene chloride are as shown in Table VIII:

The vinyl pyridine employed in this example was 2-vinyl pyridine. Similar results are obtained with copolymers of butadiene with any of the mono-vinyl pyridines. Good results are obtained not only with 3-vinyl pyridine and 4-vinyl pyridine, but also with the butadiene copolymers of the various lower alkyl vinyl pyridines, such as 2-methyl-5-vinyl pyridine and 2-vinyl-5-ethyl pyridine. The copolymer of butadiene with 2-methyl-5-vinyl pyridine is particularly desirable and gives good results when substituted for the 2-vinyl pyridine copolymer in this example. Preferred compositions may be made of from 5 to 30 parts of such copolymer, containing 10% to 50% of 2-methyl-5-vinyl pyridine, and correspondingly 95 to 70 parts of polyvinyl acetal resin containing not more than 25% residual acetate. The preferred compositions

TABLE VIII

*Blends of Formvar 7/90 with butadiene/vinyl pyridine and butadiene/vinylidene chloride rubbers*

90/10 RESIN-RUBBER RATIO

| Stock | Elastomer | Monomer Feed Ratio | Weight Percent 2nd Monomer in Product | Impact | Rockwell | Shore D | Flexural Modulus×10⁻³ | | Trans. |
|---|---|---|---|---|---|---|---|---|---|
| | | | | | | | 25° C | 75° C | |
| IX-1 | B/Vinylpyridine | 75/25 | 23 | 17.4 | 115R | 83 | 405 | 167 | Yes. |
| IX-2 | B/Vinylidenechloride | 52/48 | 34.3 | 16.5 | 112R | 82 | 375 | 122 | Yes. | are characterized by an impact strength of at least 4 foot-pounds and a flexural modulus over 100,000 p. s. i.

Extensive experimentation with numerous blends of the invention, as represented by the foregoing examples, has indicated that the percentage of the particular second monomer in the selected butadiene copolymer is an important variable. In the case of the butadiene-acrylonitrile rubbers, which represent a preferred class of rubbers for use in the invention, the copolymers having up to 50 weight-percent of combined acrylonitrile give the most satisfactory results. The copolymers having more than 50% of acrylonitrile are not preferred since they have high brittle points, and the material becomes definitely non-rubbery, and unsuited for use in the invention. In general, the rubbers containing from 15 to 50% of combined acrylonitrile are preferred, and those containing from 18% to 40% are most preferred. In this connection it may be mentioned that the blends of the invention resist embrittlement at low temperatures to a greater degree than do conventional tough gum plastics. For example, the stock coded I-7 in Example I has an impact strength of 1.3 foot-pounds at −20° C. Since this stock also resists softening up to 85° C., it is evident that the materials possess a service temperature range that is considerably wider than most gum plastics.

The nitrile rubber and resin blends are frequently preferred for such uses as making piping or containers for oils and gasoline because of the generally superior resistance of the nitrile rubber to oils and gasoline.

With regard to the effect of varying the acrylonitrile content of the elastomeric component, it is further found that with lower acrylonitrile content in the copolymer, the upper limit of the optimum range of elastomer content in the blend is lower, as shown roughly in the following table:

| Percent Acrylonitrile in Rubbery Butadiene-Acrylonitrile Elastomer | Preferred percent Elastomer in Blend |
|---|---|
| 40 | 5 to 30 |
| 35 | 5 to 30 |
| 32 | 5 to 15 |
| 26 | 5 to 15 |
| 18 | 5 to 15 |

An analogous relationship holds for the rubbery copolymers of butadiene with alkyl acrylates and methacrylates. With these copolymers the maximum alkyl ester content should not be greater than about 75 weight-percent. The operability of such copolymers in the present invention is particularly surprising in view of the fact that it has been determined that homopolymers such as those of butyl acrylate or of octyl acrylate are not operable. The alkyl acrylate or methacrylate rubbers containing about 10% to 75% of the ester copolymerized with butadiene are preferred. The lower alkyl esters, e. g., those derived from alkanols having from 1 to 8 carbon atoms, are most used in these copolymers. The blends of the invention made with the acrylate or methacrylate type of rubbers are frequently the most transparent blends, and they are frequently more free from color than the blends with other rubbers. The most satisfactory results with butadiene-styrene copolymer are only obtained when more than about 20% of styrene is combined in the copolymer. Preparation of this copolymer by the low temperature process (e. g., at a polymerization temperature of 41° F.) improves the results obtained with butadiene-styrene copolymers of low styrene content; nevertheless, for optimum results it is essential that the butadiene-styrene copolymer contain more than about 20% of styrene. As the styrene content is increased above 20% the optimum proportion of the rubber in the mixture for best impact strength should be decreased, and when using a butadiene-styrene copolymer containing as much as 50% of styrene, the percentage of rubber in the blend should be about 5 to 10%. The copolymers containing more than 50% styrene are not preferred because of their excessive hardness, and because the copolymer changes in character from a rubbery material to a definitely resinous product unsuited for use in the invention, at high proportions of combined styrene. In general the preferred range of styrene content in the copolymer is from 25 to 40%, and such copolymer is most preferably employed in an amount within the range of from 5 to 15% of the resin-rubber blend. The blends of polyvinyl acetal resin with GR–S are frequently remarkable for their toughness at temperatures of −20° C. and below.

Good results are obtained not only when practicing the invention with copolymers of butadiene with styrene, but also with similar copolymers of the various lower alkyl substituted styrenes, especially methyl styrenes, such as alpha-methyl styrene, vinyl toluene (e. g., para-methyl styrene), alpha, para-dimethyl styrene. Copolymers of butadiene with any such alkyl styrenes may be substituted in the above examples with equivalent results.

In the case of various other rubbery copolymers of butadiene with such monomers as lower alkyl fumarates, lower alkyl maleates, vinylpyridine, vinylidene chloride, alkyl vinyl ketones, and acrylamides, it is generally preferred that the rubber contain from about 10 weight-percent to about 50% of the second monomer.

In all cases it has been determined that the desired increase in impact strength is obtainable according to the invention only when the polyvinyl acetal resin is characterized by a high degree of ester replacement by aldehyde, as indicated previously. Thus, polyvinyl acetate itself, or polyvinyl alcohol itself, or copolymers of vinyl acetate and vinyl alcohol (i. e., partially hydrolyzed polyvinyl acetates), do not produce the desired effect. The most favorable results are obtained with those polyvinyl acetals having the highest degree of conversion, and in any case it is essential to employ a polyvinyl acetal characterized by at least about 75% nominal replacement of acetate by aldehyde. Another way of stating this requirement is to say that not more than 25 mole-per cent of polyvinyl acetate and/or polyvinyl alcohol groups should remain in the polyvinyl acetal. More preferably, the polyvinyl acetal resin used in the invention should have a nominal replacement of 80% or more (i. e., it should not contain more than 20 mole-per cent of residual polyvinyl acetate and/or polyvinyl alcohol). In certain cases, especially in the case of polyvinyl acetal itself, it is even more preferred that the nominal replacement be over 90%, up to as substantially complete replacement as is obtainable in practice.

The blends of the invention may be substituted to great advantage for the usual rubber or plastic compositions, or even for metals or other materials, in many applications where toughness is a requirement. Thus, the present mixtures may be used to fabricate parts for machines, such as gears and cams; parts for textile machinery such as bobbins, shuttles, pickers, etc.; containers and pipes, especially for chemical and the like operations where resistance to corrosive substances is desired, as in filter press plates; tumbling barrels for plating operations; electrical parts, such as terminal blocks, telephones, and protective casings for cable joints; as well as tote boxes and trays, luggage, radio cabinets, furniture, phonograph records, paneling, automobile parts such as steering wheels, roller skate wheels, protective helmets, printing plates, die cutting blocks, and numerous other articles, as will be evident to those skilled in the art.

Having thus described my invention, what I claim and desire to protect by Letters Patent is:

1. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 25 mole-per cent of residual polyvinyl acetate and polyvinyl alcohol, and correspondingly from 5 to 30 parts of a rubbery copolymer of at least 25 weight-per cent of butadiene with a copolymerizable monoethylenically unsaturated monomer selected from the group consisting of acrylonitrile, lower alkyl acrylates, lower alkyl methacrylates, styrene and 2-methyl-5-vinyl pyridine.

2. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing no more than 25 mole-per cent of residual polyvinyl acetate and polyvinyl alcohol, and correspondingly from 5 to 30 parts of a rubbery copolymer of butadiene with from 15 to 50 weight-per cent of acrylonitrile.

3. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 20 mole-per cent of residual polyvinyl acetate and polyvinyl alcohol, and correspondingly from 5 to 30 parts of a rubbery copolymer of butadiene with from 18 to 40 weight-per cent of acrylonitrile.

4. A gum plastic material as in claim 3 in which the said polyvinyl acetal resin is polyvinyl formal.

5. A hard, rigid, tough, thermoplastic gum plastic material having an impact strength of at least 4 foot-pounds and a flexural modulus over 100,000 p. s. i., consisting essentially of an unplasticized mixture of from 95 to 85 parts of a polyvinyl acetal resin containing not more than 20 mole-per cent of residual polyvinyl acetate and polyvinyl alcohol, and correspondingly from 5 to 15 parts of a rubbery copolymer of butadiene with from 18 to 32 weight-per cent of acrylonitrile.

6. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 25 mole-per cent of residual polyvinyl acetate and polyvinyl alcohol, and correspondingly from 5 to 30 parts of a rubbery copolymer of butadiene with from 20 to 50 weight-per cent of styrene.

7. A hard, rigid, tough, thermoplastic gum plastic material having an impact strength of at least 4 foot-pounds and a flexural modulus over 100,000 p. s. i., consisting essentially of an unplasticized mixture of from 95 to 85 parts of a polyvinyl acetal resin containing not more than 20 mole-per cent of residual polyvinyl acetate and polyvinyl alcohol, and correspondingly from 5 to 15 parts of a rubbery copolymer of butadiene with from 25 to 40 weight-per cent of styrene.

8. A gum plastic mixture as in claim 7 in which the said polyvinyl acetal resin is polyvinyl formal.

9. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 25 mole-per cent of residual polyvinyl acetate and polyvinyl alcohol, and correspondingly from 5 to 30 parts of a rubbery copolymer of butadiene with from 10 to 75 weight-per cent of a lower alkyl acrylate.

10. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of polyvinyl formal resin containing not more than 20 mole-per cent of residual polyvinyl acetate and polyvinyl alcohol, and correspondingly from 5 to 30 parts of a rubbery copolymer of butadiene with from 10 to 75 weight-per cent of a lower alkyl acrylate.

11. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 25 mole-per cent of residual polyvinyl acetate and polyvinyl alcohol, and correspondingly from 5 to 30 parts of a rubbery copolymer of butadiene with from 10 to 75 weight-per cent of a lower alkyl methacrylate.

12. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of polyvinyl formal resin containing not more than 20 mole-per cent of residual polyvinyl acetate and polyvinyl alcohol, and correspondingly from 5 to 30 parts of a rubbery copolymer of butadiene with from 10 to 75 weight-per cent of a lower alkyl methacrylate.

13. A hard, rigid, tough, thermoplastic gum plastic material having an impact strength of at least 4 foot-pounds and a flexural modulus over 100,000 p. s. i., consisting essentially of an unplasticized mixture of from 95 to 70 parts of a polyvinyl acetal resin containing not more than 25 mole-per cent of residual polyvinyl acetate and polyvinyl alcohol, and correspondingly from 5 to 30 parts of a rubbery copolymer of butadiene and from 10 to 50 weight-per cent of 2-methyl-5-vinyl pyridine.

References Cited in the file of this patent

UNITED STATES PATENTS

| Number | Name | Date |
| --- | --- | --- |
| 2,318,547 | Welch | May 4, 1943 |

FOREIGN PATENTS

| Number | Country | Date |
| --- | --- | --- |
| 405,986 | Great Britain | Feb. 12, 1934 |